(12) United States Patent
Satran et al.

(10) Patent No.: US 6,270,292 B1
(45) Date of Patent: Aug. 7, 2001

(54) CUTTING INSERT

(75) Inventors: Amir Satran, Kfar Vradim; Rafael Margulis, Karmiel, both of (IL)

(73) Assignee: Iscar Ltd., Migdal Tefen (IL)

(*) Notice: Subject to any disclaimer, the term of this patent is extended or adjusted under 35 U.S.C. 154(b) by 0 days.

(21) Appl. No.: 09/338,538

(22) Filed: Jun. 23, 1999

(30) Foreign Application Priority Data

Jun. 30, 1998 (IL) ......................................... 125143

(51) Int. Cl.$^7$ ........................................................ B23C 5/20
(52) U.S. Cl. ........................ 407/42; 407/48; 407/113; 407/114
(58) Field of Search ....................... 407/33, 34, 40, 407/42, 47, 48, 113, 114, 116, 30, 53, 115

(56) References Cited

U.S. PATENT DOCUMENTS

| D. 338,678 | * | 8/1993 | Mihic ........................ D15/139 |
| 3,466,720 | * | 9/1969 | Stier ........................... 407/113 |
| 3,701,187 | * | 10/1972 | Erkfritz ....................... 407/113 |
| 3,762,005 | * | 10/1973 | Erkfritz ....................... 407/113 |
| 4,189,265 | * | 2/1980 | Arnold et al. ............... 407/114 |
| 4,393,735 | * | 7/1983 | Eckle et al. .................. 407/48 |
| 4,729,697 | * | 3/1988 | Lacey .......................... 407/42 |
| 4,768,901 | | 9/1988 | Reinauer et al. . |
| 4,867,616 | * | 9/1989 | Jakubowicz ................ 407/113 |
| 5,059,068 | * | 10/1991 | Scott ............................ 407/33 |
| 5,158,401 | * | 10/1992 | Pawlik ......................... 407/40 |
| 5,685,670 | * | 11/1997 | Satran .......................... 407/42 |
| 5,727,910 | * | 3/1998 | Leeb ........................... 407/113 |
| 5,743,162 | * | 4/1998 | Sundstrom ................... 83/839 |
| 5,893,401 | * | 4/1999 | Eriksson ...................... 407/48 |
| 5,957,628 | * | 9/1999 | Bentjens et al. ............. 407/35 |
| 6,053,672 | * | 4/2000 | Satran et al. ................. 407/40 |
| 6,120,219 | * | 9/2000 | Satran et al. ................ 407/113 |
| 6,132,146 | * | 10/2000 | Satran et al. ................. 407/40 |

FOREIGN PATENT DOCUMENTS

WO 98/07540   2/1988  (WO).

* cited by examiner

Primary Examiner—A. L. Wellington
Assistant Examiner—Erica Ergenbright
(74) Attorney, Agent, or Firm—Pennie & Edmonds LLP

(57) ABSTRACT

A cutting insert for mounting on a tool holder of a cutting tool, comprises a front cutting portion having an operative front surface associated with at least one cutting edge, and a trailing mounting portion. The trailing mounting portion has upper, lower and side walls extending from the front cutting portion to a rear abutment wall of the trailing mounting portion oriented generally co-directionally with said operative front surface. The side walls of the trailing mounting portion meet with the rear abutment wall at rear edges. The rear abutment wall comprises two lateral surfaces and a central surface therebetween, the lateral surfaces converging from the rear edges in the direction towards the front cutting portion, and the central surface protruding, in the direction away from the front cutting portion, rearwardly from the lateral surfaces and meeting therewith at merging edge regions.

23 Claims, 8 Drawing Sheets

US 6,270,292 B1

CUTTING INSERT

FIELD OF THE INVENTION

The present invention refers to a cutting insert of the type having a front cutting portion associated with an operative cutting edge and a trailing mounting portion for mounting the insert in a cutting tool.

BACKGROUND OF THE INVENTION

The present invention particularly refers to compactly designed cutting inserts for mounting thereof on a cutting tool where the space available for arranging insert receiving pockets therein is limited. This specifically concerns rotary cutting tools of the type used in end milling, drilling and plunging operations and the like, which are formed with a plurality of chip evacuation flutes and which bear cutting inserts on a front face thereof between the flutes.

In order to make efficient use of the space available for mounting the cutting inserts at the front face surface of such cutting tools, it is desirable to optimize the geometry of the cutting inserts so as to enable them to have relatively long cutting edges with trailing mounting portions being of substantially reduced dimensions.

Patent Application No. PCT/IL97/00270 discloses a cutting insert designed to solve the above problem in an end-milling cutter. The cutting insert comprises a front cutting portion having an operative front surface associated with upper and lower arcuate cutting edges and side edges therebetween, and a trailing mounting portion having upper, lower and side walls, all extending away from the respective edges of the front cutting portion, the side walls converging in the direction away from the front cutting portion, and being shorter than a distance between extreme points of each arcuate cutting edge. The insert is formed with a clamping screw bore passing through the upper and lower walls of the trailing mounting portion, and is mounted on the cutter so that an axis of this bore is substantially perpendicular to the rotary axis of the cutter.

U.S. Pat. No. 4,768,901 discloses a cutting insert mounted on a front face of a drilling tool. The cutting insert has a front cutting portion associated with a cutting edge and a trailing mounting portion having upper, lower and side walls, and a rear wall extending therebetween. The cutting insert has a clamping screw bore which passes through the upper and lower walls of the trailing mounting portion, the insert being mounted so that an axis of the clamping screw bore is parallel to a rotary axis of the drilling tool. The rear wall of the trailing mounting portion comprises stepped lateral abutment surfaces disposed adjacent the side walls of the trailing mounting portion relatively close to the cutting edge, and semi-cylindrical central surface disposed between the lateral abutment surfaces and extending around a rear portion of the clamping screw bore.

It is the object of the present invention to provide a new cutting insert which, inter alia, has advantages in respect of its mounting in a cutting tool of the above kind.

SUMMARY OF THE INVENTION

In accordance with one aspect of the present invention, there is provided a cutting insert for mounting on a cutting tool, comprising:

a front cutting portion having an operative front surface associated with at least one cutting edge, and a trailing mounting portion having upper, lower and side walls extending from said front cutting portion to a rear abutment wall of the trailing mounting portion oriented generally co-directionally with said operative front surface, the side walls of the trailing mounting portion meeting with said rear abutment wall at rear edges;

said rear abutment wall comprising two lateral surfaces and a central surface therebetween, said lateral surfaces converging from said rear edges in the direction towards the front cutting portion, and said central surface protruding outwardly from adjacent portions of the lateral surfaces in the direction away from said front cutting portion, and meeting therewith at merging edge regions.

In accordance with another aspect of the present invention, there is provided a tool holder having a longitudinal axis of rotation and a front face formed with at least one insert receiving pocket for bearing therein a cutting insert having an operative cutting edge;

the insert receiving pocket having a pocket base wall and a pocket rear wall which is disposed at a rear end of the pocket defined with respect to a direction of rotation in which the tool holder is designed to rotate, and is oriented transversely to the pocket base wall and transversely to said direction of rotation;

the pocket rear wall having two lateral portions and a central portion therebetween which is rearwardly depressed relative to adjacent regions of the lateral portions and meets therewith via merging edge regions, said lateral portions of the pocket rear wall converging from outer ends thereof in the direction towards the cutting edge of the cutting insert.

With the design of the rear abutment wall of the cutting insert and the pocket rear wall and, particularly, with the specific orientation of the lateral surfaces of the rear abutment wall of the cutting insert and lateral portions of the pocket rear wall, in accordance with the present invention, there is achieved a favorable direction of reaction forces exerted on the body of the tool holder during a cutting operation. By virtue of this, stress concentration and consequent local deformations may be eliminated in those regions of the tool holder body which are most critical from this point of view.

Preferably, the cutting insert is secured in the insert receiving pocket by means of a clamping screw. In this case, the cutting insert is formed with a clamping screw bore and the pocket base wall is formed with a pocket threaded bore, for receiving therein the clamping screw. The clamping screw bore of the cutting insert passes between the upper and lower walls of its trailing mounting portion substantially perpendicularly thereto.

In one embodiment of the present invention, the pocket threaded bore is directed generally co-directionally with the longitudinal axis of the tool holder. In another embodiment of the present invention, the pocket threaded bore is directed transversely to the longitudinal axis of the tool holder.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE DRAWINGS

Figure 1:
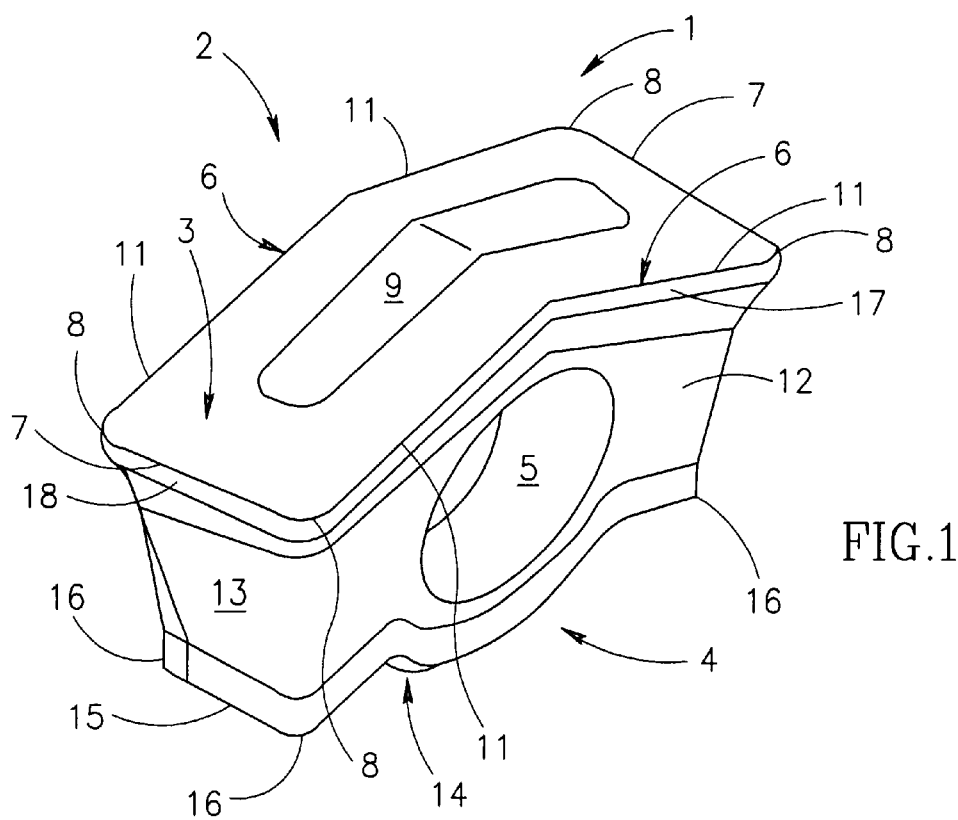
FIG. 1 is a perspective view of a cutting insert according to the present invention.

FIGS. 1 to 4 illustrate a cutting insert 1 according to the present invention, which comprises a front cutting portion 2 with an operative front surface 3 and a trailing mounting portion 4 formed integrally therewith and extending from the front cutting portion 2 in a rear direction of the cutting insert 1. The cutting insert is formed with a, having a diameter d, for mounting thereof on a cutting tool. The cutting insert 1 is indexable and is designed with 180° symmetry around an axis of symmetry A (FIG. 2) which passes through a central point 0 (FIG. 4) of the operative front surface 3 and through an axis S of the clamping screw bore 5, being perpendicular thereto. The insert has a reference plane P in which the axis of symmetry lies and which is perpendicular to the axis S of the clamping screw bore 5.

As seen in FIGS. 1, 2, 3 and 4, the operative front surface 3 of the front cutting portion 2 is substantially transverse to the reference plane P of the cutting insert. The operative front surface 3 is bound by major upper and lower cutting edges 6 which are generally parallel to the reference plan P and by minor side cutting edges 7 which are transverse to the reference plan P and which extend between the major cutting edges 6 meeting therewith at insert front corners 8. The operative front surface 3 slopes inwardly from the major cutting edges 6, minor cutting edges 7 and front corners 8 and further rises towards a centrally disposed chip breaker 9 protruding outwardly therefrom. Thereby, the cutting edges 6 and 7 are provided with chip rake surfaces having appropriate chip control means.

Figure 2:
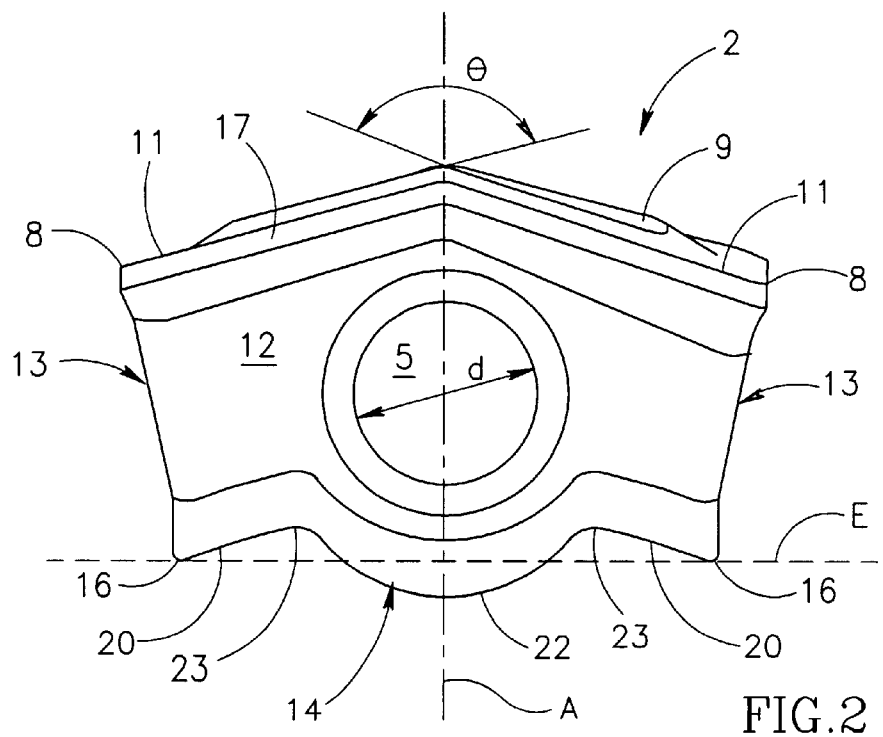
FIG. 2 is a top view of the cutting insert shown in FIG. 1.

Each major cutting edge 6 of the cutting insert 1 has two component cutting edges 11 which extend from their associated insert front corners 8 towards the reference plan P and outwardly of the cutting insert 1. As shown in FIG. 2, the component cutting edges 11 of each major cutting edge 6 define therebetween an interior obtuse angle θ.

The trailing mounting portion 4 has prismoidal shape with upper and lower walls 12 oriented generally parallel to the reference plane P of the cutting insert and side wall 13 oriented transversely to the reference plane P. The upper and lower walls 12 and the side walls 13 extend from the respective upper and lower cutting edges 6 and side edges 7 of the front cutting portion 2 to a rear abutment wall 14 of the trailing mounting portion 4. The rear abutment wall 14 meets the side walls 13 at insert rear edges 15 which extend between insert rear corners 16. The rear abutment wall 14 is directed substantially transversely to the upper, lower and side walls 12 and 13. The clamping screw bore 5 passes through the upper and lower walls 12.

Figure 3:
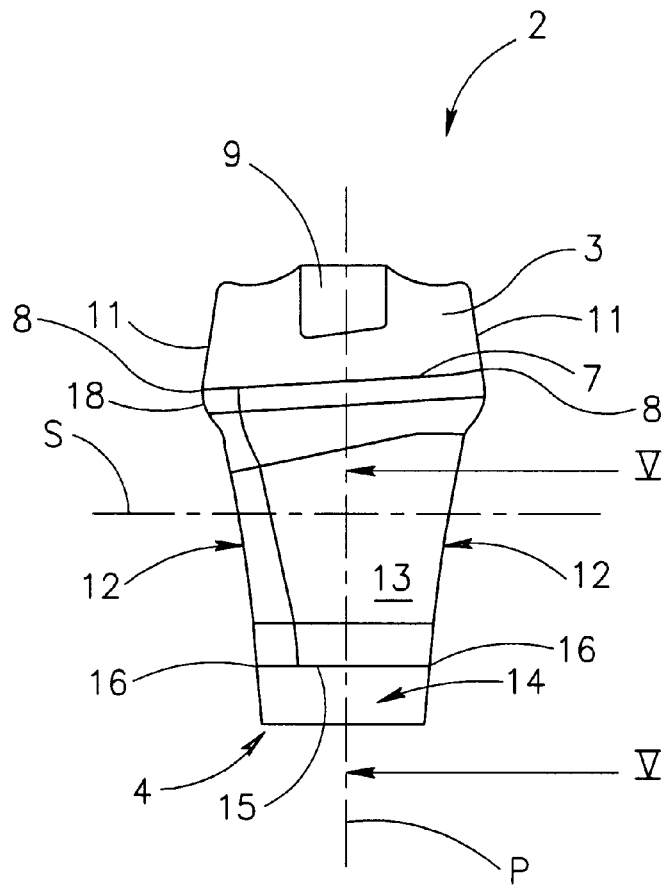
FIG. 3 is a side view of the cutting insert shown in FIG. 1.
Figure 4:
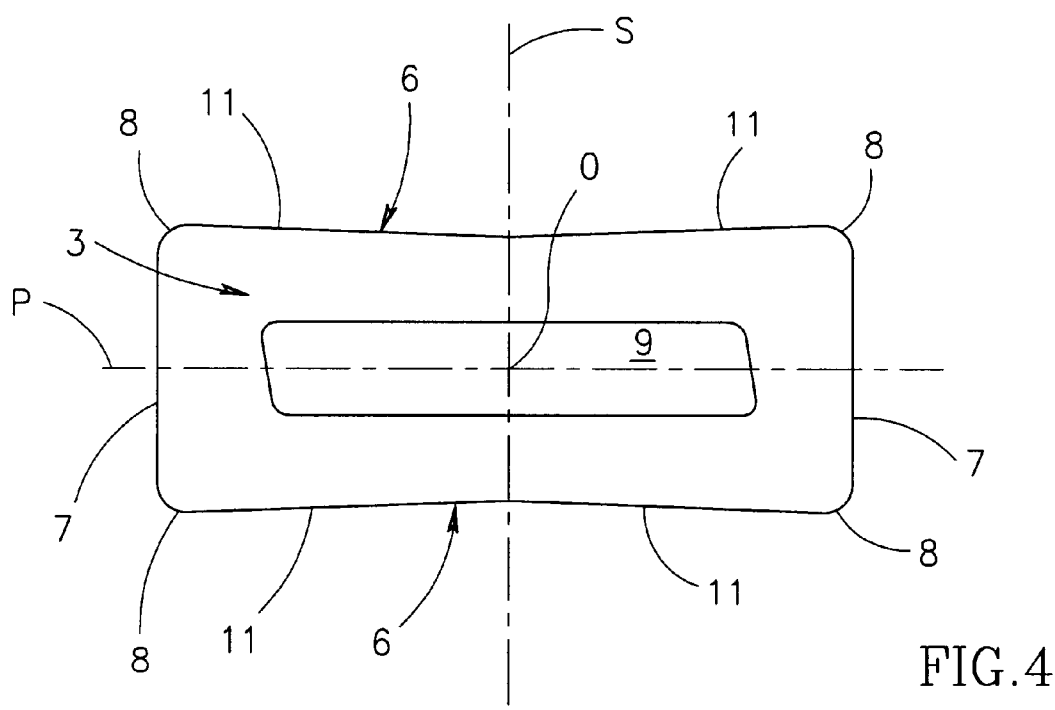
FIG. 4 is a front view of the cutting insert shown in FIG. 1.

As seen in FIG. 3, the upper and lower walls 12 of the trailing mounting portion 4 converge towards the rear abutment wall 14, and so do the side walls 13 which are most clearly seen in FIG. 2. The upper and lower walls 12 and side walls 13 merge with the respective upper and lower cutting edges 6 and side cutting edges 7 via respective relief surfaces 17 and 18.

Figure 5:
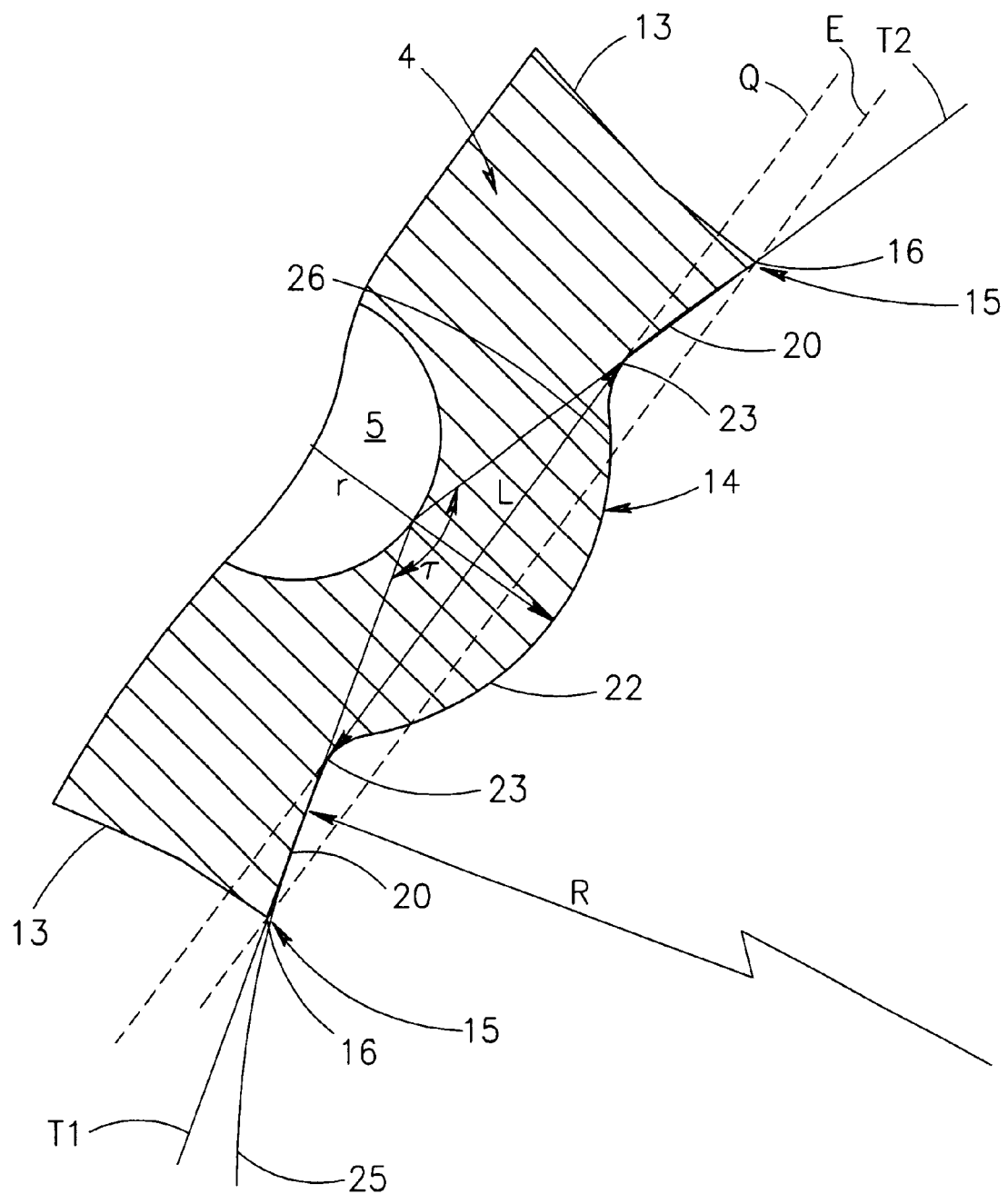
FIG. 5 is an enlarged partial cross-sectional view of a trailing mounting portion of the cutting insert as shown in FIG. 3, taken along the line V—V.

As seen in FIGS. 2 and 5, the rear abutment wall 14 comprises two lateral surfaces 20 disposed adjacent the rear edges 15 and central surface 22 therebetween protruding rearwardly from the lateral surfaces 20 and meeting therewith at merging edge regions 23. The lateral surfaces 20 converge from the rear edges 15 in the direction of the front cutting portion 2 and, as seen in FIG. 5, are oriented so that an imaginary plane Q passing through the merging edge regions 23 is closer to the front cutting portion 2 (not shown) than the rear edges 15 and, preferably, is further from the front cutting portion 2 than the axis S of the clamping screw bore 5. As seen in the top view of FIG. 2, the central surface 22 extends in a direction away from the front cutting portion 2 to protrude rearwardly past an imaginary reference plane E passing through the insert rear edges 16, while lateral surfaces 23 extend in a direction towards the front cutting portion 2 and are positioned between the imaginary reference plane E and the front cutting portion 2. As shown in FIG. 5, the orientation of the lateral surfaces 20 is defined by imaginary planes T1 and T2 both passing through their associated rear edge 15 and merging edge region 23, and form therebetween and angle τ substantially equal to the angle θ formed by the component cutting edges 11. As seen in FIG. 5, the distance L between the merging edge regions 23 is preferably greater than the maximal diameter of the clamping screw bore 5.

As seen in FIG. 5, the lateral surfaces 20 lie substantially on a first cylindrical arc 25 which has an axis (not shown) located outwardly of the cutting insert 1 to the rear thereof, and the central surface 22 lies substantially on a second cylindrical arc 26 which has an axis (not shown) located inwardly of the cutting insert 1. The axes of the arcs 25 and 26 are parallel and co-planar with the axis S of the clamping screw bore 5. A radius r of the second cylindrical arc 26 is substantially smaller than a radius R of the first cylindrical arc 25. Alternatively, the lateral surfaces 20 may be planar or may have any other appropriate shape.

Figure 6:
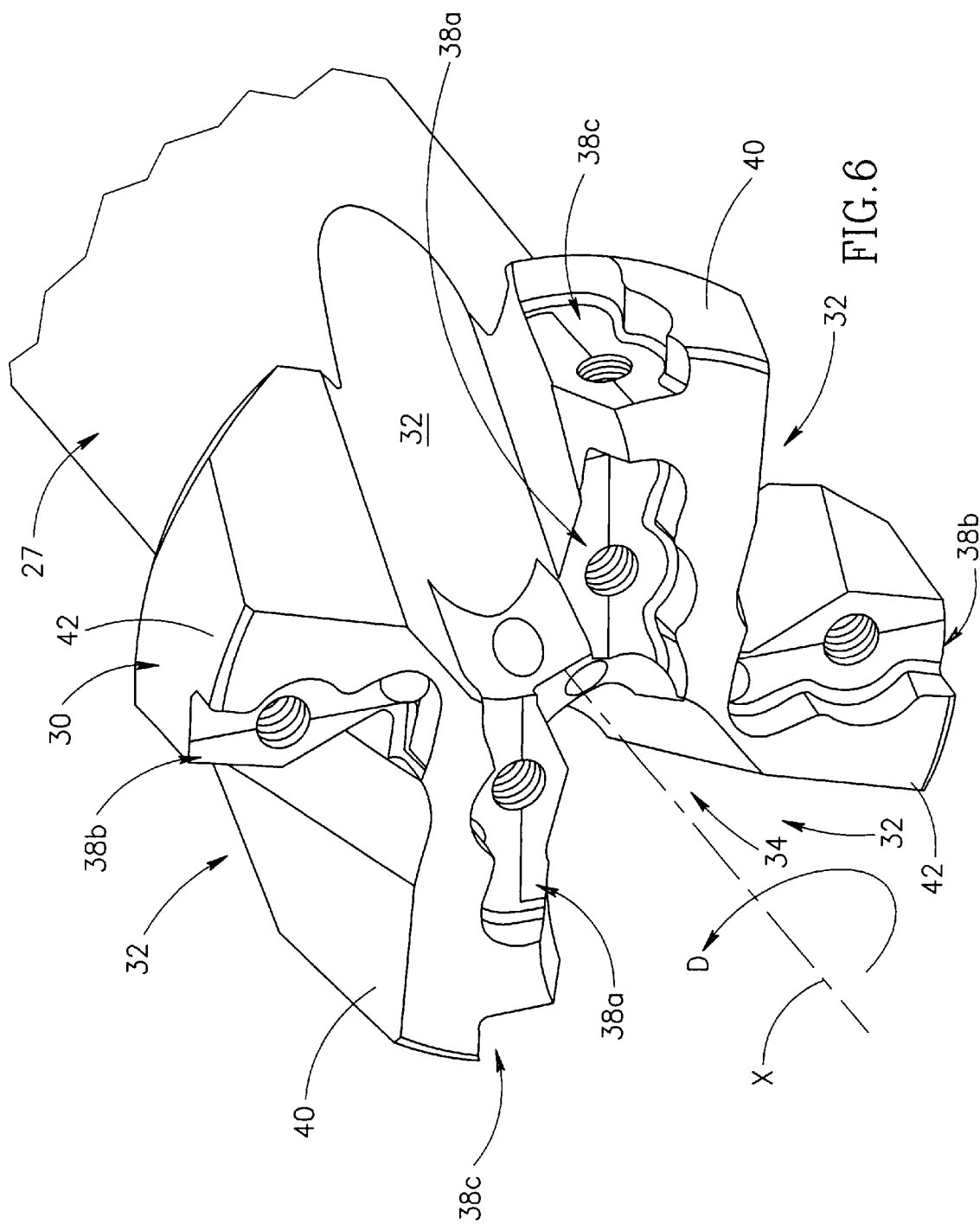
FIG. 6 is a perspective view of a tool holder according to the present invention.

FIG. 6 illustrates a tool holder 27 in which cutting inserts of the present invention are to be mounted. As seen, the tool holder 27 has a cutting head 30 and is formed with chip evacuation flutes 32 extending from a front face 34 of the cutting head 30 along a longitudinal axis of rotation X of the tool holder. The tool holder 27 is formed, at the front face 34 thereof, with a pair of identical insert receiving pockets 38a located on body portions 40 of the cutting head 30 close to the longitudinal axis X, a pair of identical insert receiving pockets 38b located on body portions 42 of the cutting head 30 remote from the longitudinal axis X and a pair of identical insert receiving pockets 38c located on the same body portions 40 as the insert receiving pockets 38a but at the periphery thereof.

Since the insert receiving pockets 38a, 38b, 38c are all designed to receive cutting inserts identical to the cutting insert 1 described above and, consequently, all have a shape generally corresponding to the shape of the cutting insert 1, only one insert receiving pocket, generally designated as 38, will be described below in detail with reference to FIG. 7.

Figure 7:
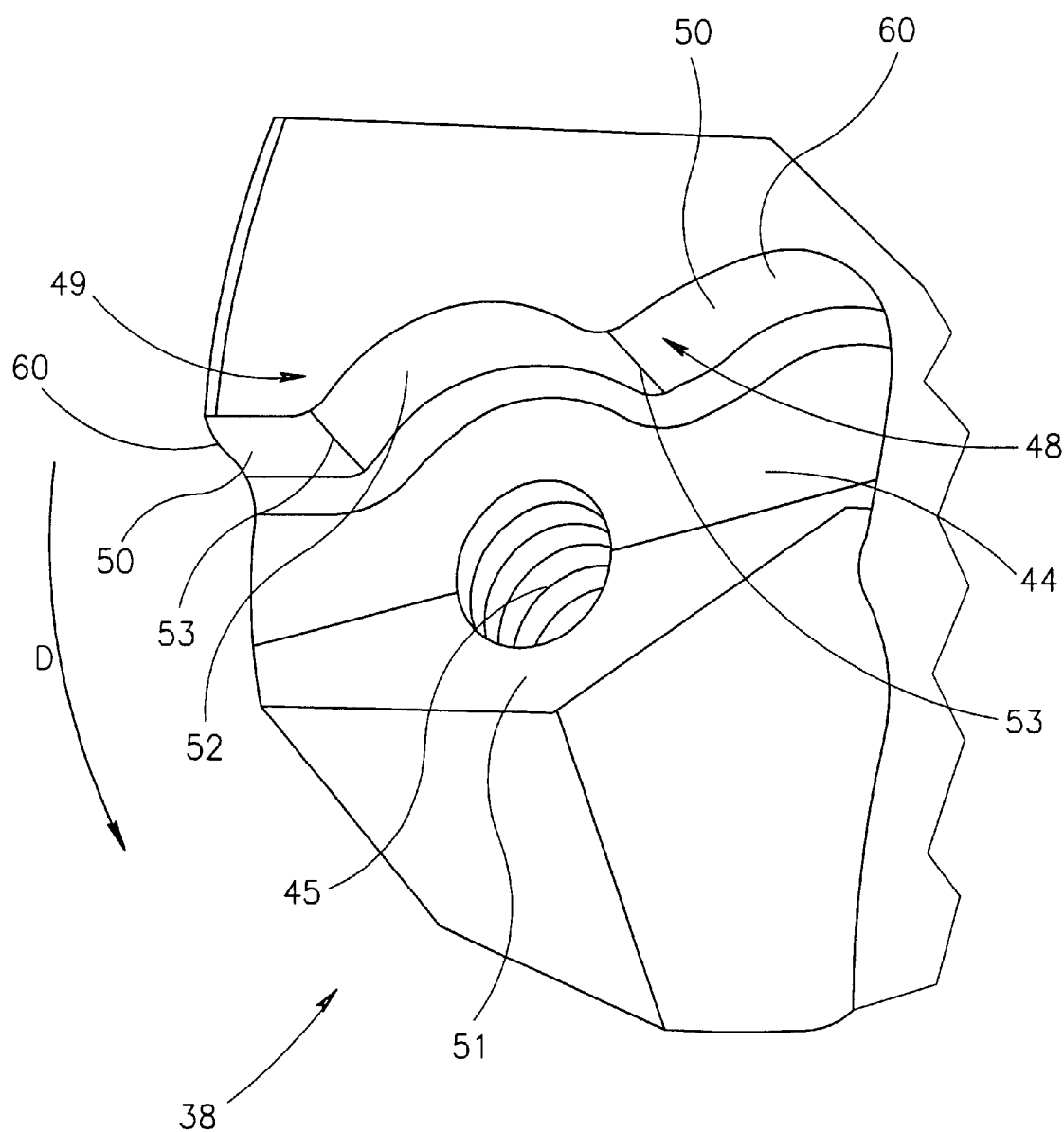
FIG. 7 is a perspective view of an insert receiving pocket formed in the tool holder shown in FIG. 6.

As shown in FIG. 7, the insert receiving pocket 38 has a pocket base wall 44 formed with a pocket threaded bore 45 and a pocket rear wall 48 which is disposed at a rear end 49 of the pocket 38 away from a front end 51 thereof, the rear and front ends being defined with respect to a direction of rotation D in which the tool holder is designed to rotate. The pocket rear wall 48 is oriented substantially perpendicularly to the pocket base wall 44 and substantially perpendicularly to the direction of rotation D.

The pocket rear wall 48 has a shape generally corresponding to the shape of the rear abutment wall 14 of the cutting insert 1. Particularly, the pocket rear wall 48 has a pair of lateral portions 50 and a arcuate central portion 52 therebetween, which is depressed rearwardly relative to adjacent regions to the respective lateral portions 50 and meet therewith at merging edge regions 53. The lateral portions 50 of the pocket rear wall 48 converge from outer ends 60 thereof towards the pocket threaded bore 45 so that the merging edge regions 53 are located ahead of the outer ends 60 of the lateral portions 50 with respect to the direction of rotation D.

Figure 8A:
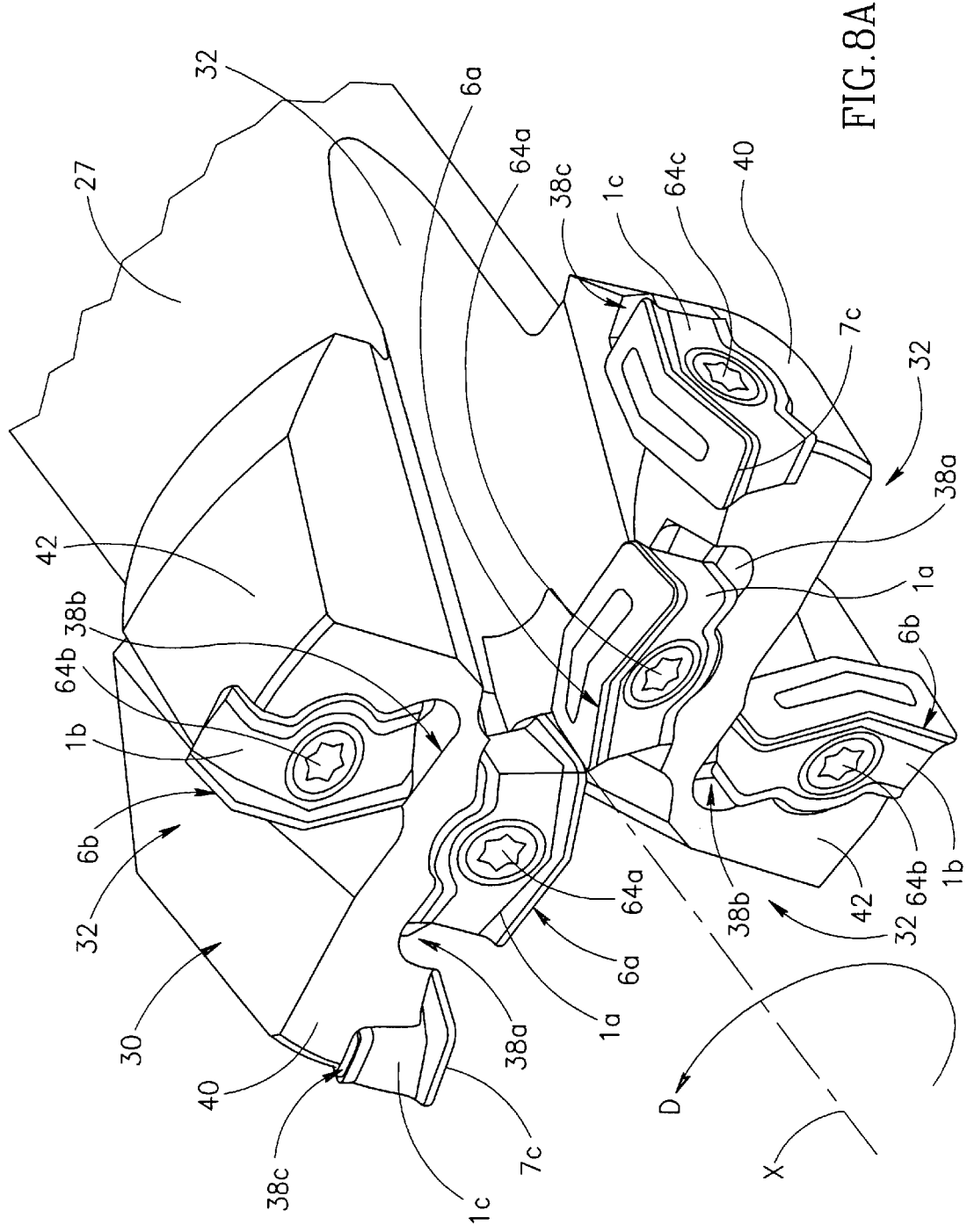
FIG. 8A is a perspective view of a cutting tool assembly comprising the tool holder shown in FIG. 6 and cutting inserts as shown in FIG. 1.
Figure 8B:
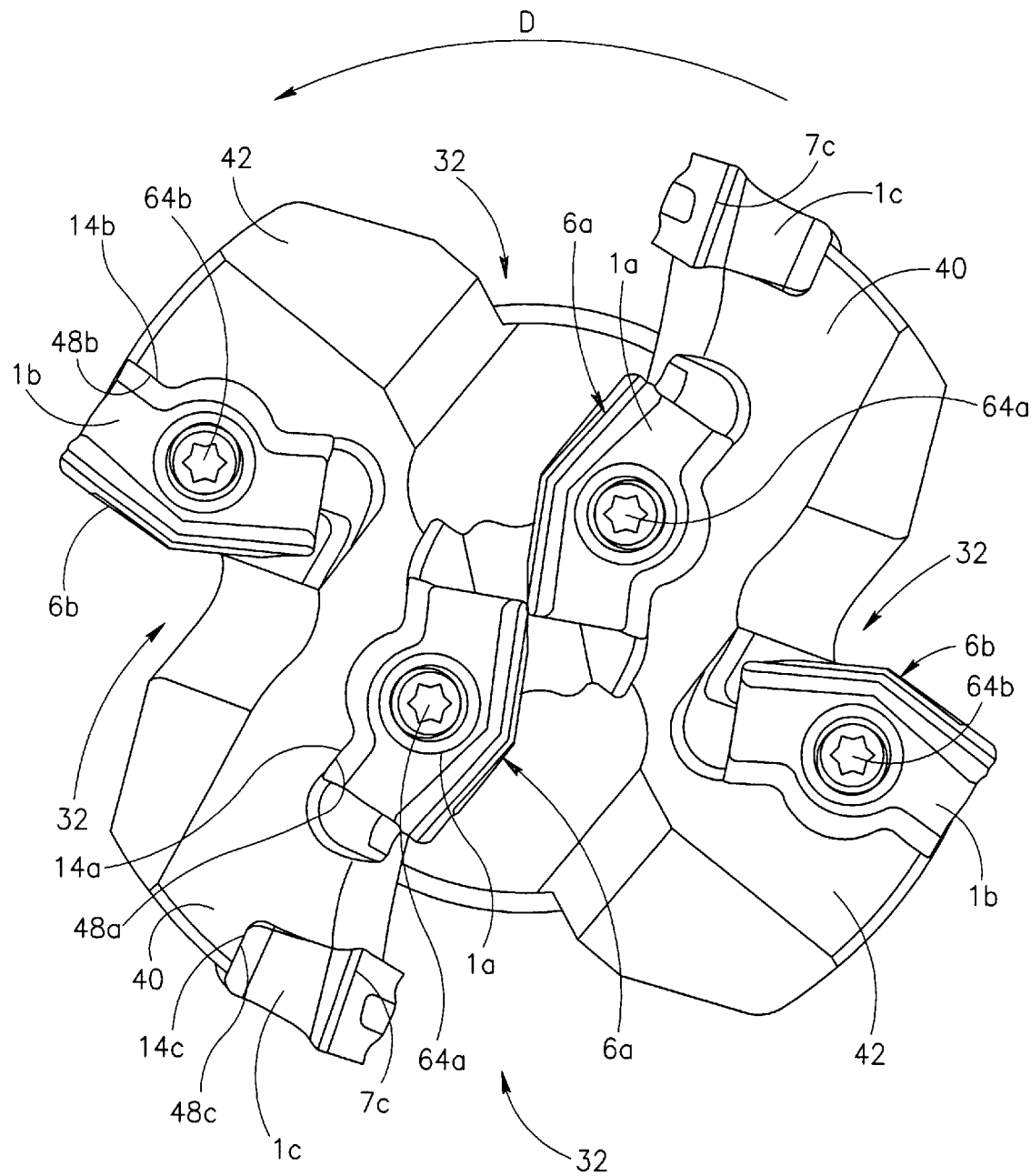
FIG. 8B is a front view of the cutting tool assembly shown in FIG. 8A.

FIGS. 8a and 8b illustrate a cutting tool assembly for plunging operations which comprises the tool holder 27 as shown in FIG. 6 and cutting inserts 1a, 1b and 1c as shown in FIGS. 1 to 4, according to the present invention, mounted in the respective insert receiving pockets 38a, 38b, 38c of the tool holder 27 at different distances from the longitudinal axis X thereof and in different manners.

As seen, the cutting inserts 1a and 1b are mounted so that their respective clamping screws 64a and 64b are oriented substantially parallel to the longitudinal axis X of the cutting tool, whereby their lower major cutting edges 6a and 6b are presented in an operative position. The cutting inserts 1c are mounted so that their clamping screws 64c are substantially perpendicular to the longitudinal axis X, whereby their minor cutting edges 7c are presented as operative cutting edges.

Figure 9A:
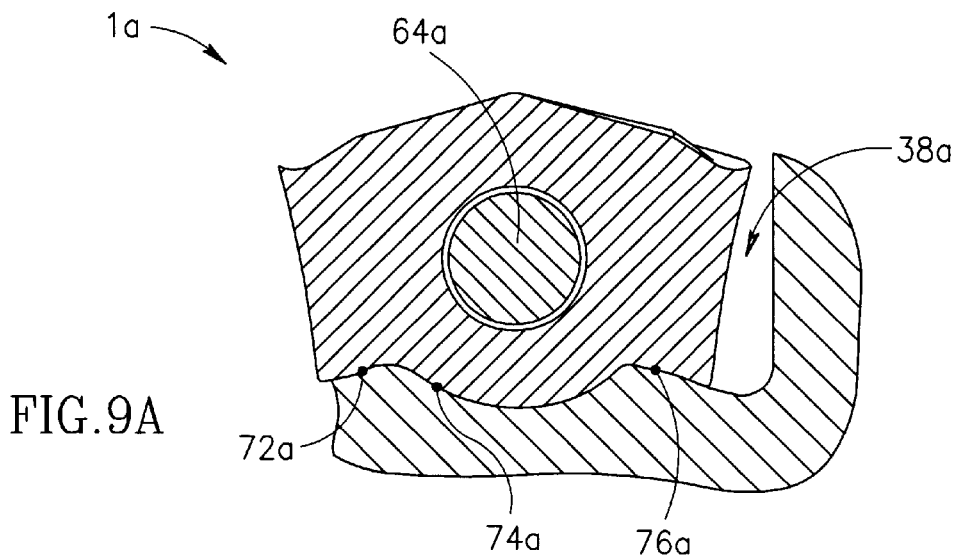
FIGS. 9A, 9B and 9C are cross-sectional views of respective cutting inserts 1a, 1b and 1c when mounted on the tool holder of the cutting tool shown in FIGS. 8A and 8B.
Figure 9B:
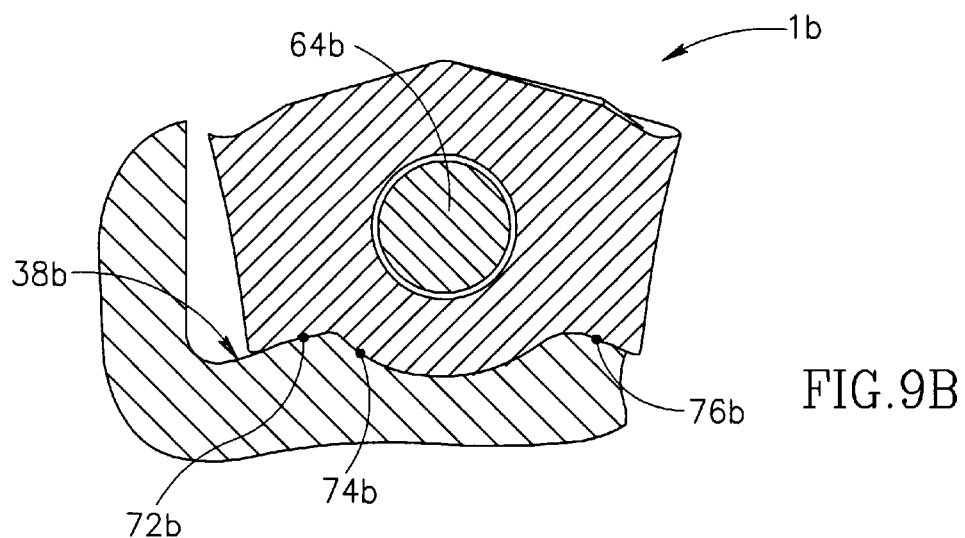
Figure 9C:
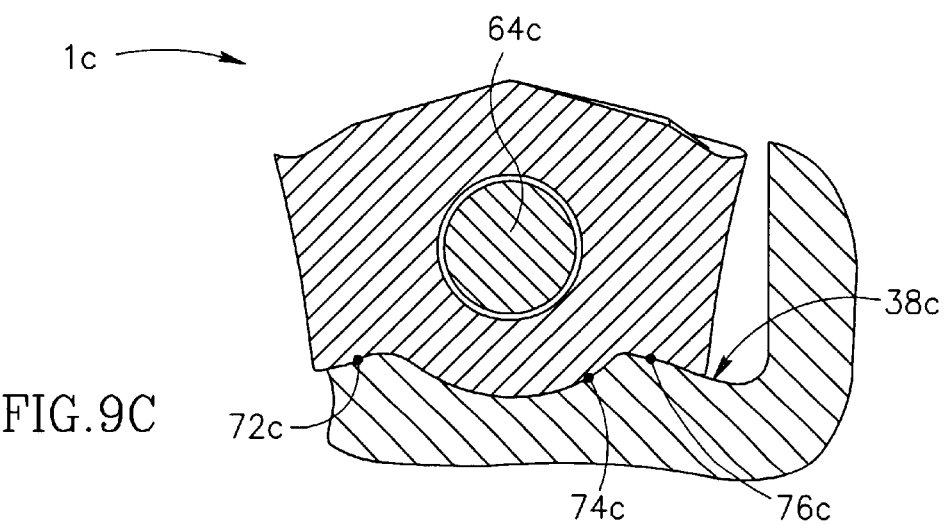

The support of the cutting inserts 1a, 1b and 1c in their respective insert receiving pockets 38a, 38b and 38c is provided by the abutment of the upper walls 12 of the inserts against the base wall 44 of the pockets, and by the abutment of the rear abutment walls 14 of the inserts against the rear walls 48 of the pockets, the latter abutment taking place at lateral abutment areas 72 and 76 and central abutment areas 74 as illustrated specifically in FIGS. 9a, 9b and 9c. These figures show, respectively, the cutting inserts 1a, 1b and 1c and their abutment areas 72, 74 and 76 which are designated respectively as 72a, 74a and 76a; 72b, 74b and 76b; and 72c, 74c and 76c. The location of the abutment areas in each cutting insert and, particularly, the location of the central abutment area 74, depends on the position of the cutting insert in the cutting tool and is such as to ensure that the cutting insert is properly supported against the cutting forces exerted thereon during cutting operations.

In addition, due to the specific orientation of the lateral surfaces of the rear abutment wall of the cutting insert and the lateral portions of the pocket rear wall, in accordance with present invention, there is achieved a favorable direction of reaction forces exerted on the body of the tool holder during a cutting operation. By virtue of this, stress concentration and consequent local deformations may be eliminated in those regions of the tool holder body which are most critical from this point of view, for example, with reference to FIG. 8b, in the region of the body portion 42 adjacent the outermost edge of the pocket rear wall 48b of the pocket 38b, which supports the cutting insert 1b at the outermost edge of its rear abutment wall 14b.

The cutting insert according to the present invention and particularly its front cutting portion and its trailing mounting portion may have alternative designs not described above and not shown in the drawings. Thus, the front cutting portion of the insert may have any appropriate geometry depending on a cutting operation in which the cutting tool assembly is to be used, and appropriate shape of its cutting edges. For example, the major cutting edges of the cutting inserts may have only one component cutting edge or rather may consist of more than two component cutting edges, each of which may be straight or curved. The lateral and central surfaces of the rear abutment wall of the insert trailing portion and the lateral and central portions of the pocket rear wall may have any shape assuring the predetermined location of their abutment area. Thus, for example, the lateral surfaces of the insert rear abutment wall and of the pocket rear wall may have different radii of curvature, or rather the lateral surfaces of either of them may not be arcuate. The cutting tool may have a different number of chip evacuation flutes and a different number of cutting inserts mounted therein. The cutting insert may be used in cutting tools designed for cutting operations other than plunging.

| REFERENCE NUMERALS: | |
|---|---|
| 1 | cutting insert in Figs. 1 to 5 |
| 1a, 1b, 1c | cutting inserts in Figs. 8a, 8b |
| 2 | front cutting portion |
| 3 | operative front surface |
| 4 | trailing mounting portion of the cutting insert 1 |
| 5 | clamping screw bore |
| 6 | major cutting edges of the cutting insert 1 |
| 6a, 6b | lower major cutting edges of the cutting inserts 1a and 1b |
| 7 | minor cutting edges of the cutting insert 1 |
| 7c | minor cutting edges of the cutting insert 1c |
| 8 | insert front corners |
| 9 | chip breaker |
| 11 | component cutting edges of the cutting insert 1 |
| 12 | upper and lower walls of the trailing mounting portion |
| 13 | side walls of the trailing mounting portion |
| 14 | rear abutment wall of the trailing mounting portion of the cutting insert 1 |
| 15 | rear edges of the trailing mounting portion 4 |
| 16 | insert rear corners |
| 17, 18 | relief surfaces |
| 20 | lateral surfaces of the rear abutment wall of the cutting insert 1 |
| 22 | central surface of the rear abutment wall of the cutting insert 1 |
| 23 | merging edge regions of the rear abutment wall 14 |
| 25 | first cylindrical arc |
| 26 | second cylindrical arc |
| 27 | tool holder |
| 30 | cutting head of the tool holder |
| 32 | chip evacuation flutes |
| 34 | front face of the cutting tool |
| 38 | general designation of an insert receiving pocket |
| 38a, 38b, 38c | insert receiving pockets |
| 40, 42 | body portions of the cutting head |
| 44 | base wall of the insert receiving pocket 38 |
| 45 | pocket threaded bore of the insert receiving pocket 38 |
| 48 | rear wall of the insert receiving pocket 38 |

-continued

REFERENCE NUMERALS:

| | |
|---|---|
| 49 | a rear end of the insert receiving pocket 38 |
| 50 | lateral portions of the rear wall 48 |
| 51 | a front end of the insert receiving pocket 38 |
| 52 | central portion of the rear wall 48 |
| 53 | abutment corners of the rear wall 48 |
| 60 | outer ends of the lateral portions 50 |
| 64a, 64b, 64c | clamping screws |
| 72, 76 | general designation of lateral abutment areas |
| 72a, 72b, 72c, 76a, 76b, 76c | lateral abutment areas of the respective cutting inserts 1a, 1b, 1c |
| 74 | general designation of central abutment areas |
| 74a, 74b, 74c | central abutment areas of the respective cutting inserts 1a, 1b, 1c |
| θ | angle between component cutting edges 11 |
| τ | angle between imaginary planes T1 and T2 of lateral surfaces 20 |
| A | axis of symmetry |
| D | direction of rotation |
| O | central point of the operative front surface 3 |
| P | reference plane |
| Q | imaginary plane passing through abutment corners 23 |
| R, r | radii of the respective first and second cylindrical arcs 25 and 26 |
| S | axis of the clamping screw bore 5 |
| T1, T2 | imaginary planes of the lateral surface 20 |
| X | longitudinal axis of the cutting tool |

What is claimed is:

1. A cutting insert for mounting on a cutting tool, comprising:
   a front cutting portion having an operative front surface associated with at least one cutting edge, and
   a trailing mounting portion having upper, lower and side walls extending from said front cutting portion to a rear abutment wall of the trailing mounting portion oriented generally co-directionally with said operative front surface, the side wall of the training mounting portion meeting with said rear abutment wall at rear edges;
   said rear abutment wall comprising two lateral surfaces connected to a central surface therebetween my merging edge regions having a predetermined distance (L) between them, said lateral surfaces converging from said rear edges in a direction towards the front cutting portion, and said central surface protruding, in a direction away from said front cutting portion, rearwardly from the lateral surfaces and past a reference plane passing through the rear edges.

2. A cutting insert according to claim, 1, wherein the side walls of the trailing mounting portion converge towards the rear abutment wall thereof.

3. A cutting insert according to claim 1, wherein the cutting insert is formed with a clamping screw bore passing between the upper and lower wall of its trailing mounting portion and having and axis substantially parallel to the reference plane.

4. A cutting insert according to claim 3, wherein the merging edge regions are closer to the reference plane than to the axis of said clamping screw bore.

5. A cutting insert according to claim 3, wherein the distance (L) between the merging edge regions is greater than a diameter (d) of said clamping screw bore.

6. A cutting insert according to claim 3, wherein the lateral surfaces lie substantially on a first cylindrical arc having a radius (R) and an axis located outwardly of the cutting insert to the rear thereof and the central surface lies substantially on a second cylindrical arc having a radius (r) and an axis located inwardly of the cutting insert.

7. A cutting insert according to claim 6, wherein the axes of the first and second cylindrical arcs are parallel and co-planar with the axis of the clamping screw bore.

8. A cutting insert according to claim 7, wherein the radius (r) of the second cylindrical arc is substantially smaller than the radius (R) of the first cylindrical arc.

9. A cutting insert according to claim 1, wherein the operative front surface is bound by major upper and lower cutting edges and by minor side cutting edges which extend between the major cutting edges and meet therewith at insert front corners, each of the major cutting edges of the front cutting portion has two component cutting edges that converge in a forward direction of the cutting insert from the insert front corners associated therewith and define with each other an interior obtuse angle, said lateral surfaces of the trailing mounting portion being oriented substantially along imaginary planes which converge at an angle substantially equal to said interior obtuse angle.

10. A tool holder having a longitudinal axis of rotation and a front face formed with at least one insert receiving pocket for receiving therein a cutting insert;
   the at least one insert receiving pocket having a pocket base wall and a pocket rear wall which is disposed at a rear end of the at least one pocket defined with respect to a direction of rotation in which the tool holder is designed to rotate, and is oriented transversely to the pocket base wall and transversely to said direction of rotation;
   the pocket rear wall having two lateral portions connected to a central portion therebetween which is rearwardly depressed relative to the lateral portions and meets therewith via merging edge regions, said lateral portions of the pocket rear wall converging from outer ends thereof in a direction towards a front end of the at least one pocket.

11. A tool holder according to claim 10, wherein the pocket base wall is formed with a pocket threaded bore, for receiving therein a clamping screw for securing the cutting insert in said at least one insert receiving pocket.

12. A tool holder according to claim 11, wherein the pocket threaded bore is directed generally co-directionally with the longitudinal axis of the tool holder.

13. A tool holder having a longitudinal axis of rotation and a front face formed with at least one insert receiving pocket for receiving therein a cutting insert;
   the at least one insert receiving pocket having a pocket base wall and a pocket rear wall which is disposed at a rear end of the at least one pocket defined with respect to a direction of rotation in which the tool holder is designed to rotate, and is oriented transversely to the pocket base wall and transversely to said direction of rotation;
   the pocket rear wall having two lateral portions connected to a central portion therebetween which is rearwardly depressed relative to the lateral portions and meets therewith via merging edge regions, said lateral portions of the pocket rear wall converging from outer ends thereof in a direction towards a front end of the at least one pocket, wherein
   the pocket base wall is formed with a pocket threaded bore, for receiving therein a clamping screw for securing the cutting insert in said at least one insert receiving pocket, and the pocket threaded bore is directed transversely to the longitudinal axis of the tool holder.

14. A cutting insert comprising:

a front cutting portion having an operative front surface associated with at least one cutting edge;

a trailing mounting portion having upper, lower and first and second side walls extending from said front cutting portion to a rear abutment wall, the first and second side walls meeting with said rear abutment wall at respective first and second rear edges, wherein the rear abutment wall comprises:

a central surface extending in a direction away from the front cutting portion to protrude rearwardly past a reference plane passing through said first and second rear edges, and first and second lateral surfaces positioned between the first and second rear edges, respectively and the central surface, each of the first and second lateral surfaces extending in a direction towards the front cutting portion and being positioned between the reference plane and the front cutting portion.

15. A cutting insert according to claim 14, wherein the side walls of the trailing mounting portion converge towards the rear abutment wall.

16. A cutting according to claim 14, wherein the central surface meets with the first and second lateral surfaces at first and second merging edge regions, respectively, the merging edge regions being situated between the reference plane and the front cutting portion.

17. A cutting insert according to claim 14, wherein the cutting insert is formed with a clamping screw bore passing between the upper and lower walls of the trailing mounting portion, the clamping screw bore having an axis substantially parallel to said reference plane.

18. A cutting insert according to claim 17, wherein the axis of the clamping screw bore is closer to the front cutting portion than the reference plane.

19. A cutting insert according to claim 14, wherein:

the central surface meets with the first and second lateral surfaces at first and second merging edge regions respectively, the merging edge regions being situated between the reference plane and the front cutting portion;

the cutting insert is formed with a clamping screw bore passing between the upper and lower walls of the trailing mounting portion, the clamping screw bore having an axis substantially parallel to said reference plane; and a distance (L) between the first and second merging edge regions is greater than a diameter (d) of the clamping screw bore.

20. A cutting insert according to claim 14, wherein the at least one cutting edge of the front cutting portion comprises a pair of component cutting edges which extend from front corners of the insert associated therewith in a forward direction away from the trailing mounting portion, and which define with each other an interior obtuse angle, and the lateral surfaces of the trailing mounting portion are oriented substantially along imaginary planes which converge at an angle substantially equal to said interior obtuse angle.

21. A cutting tool assembly comprising:

a tool holder having a longitudinal axis of rotation and a front face formed with at least one insert receiving pocket, the at least one insert receiving pocket having a pocket base wall and a pocket rear wall which is disposed at a rear end of the at least one insert receiving pocket defined with respect to a direction of rotation in which the tool holder is designed to rotate, and is oriented transversely to the pocket base wall and transversely to said direction of rotation;

the pocket rear wall having two lateral portions connected to a central portion therebetween which is rearwardly depressed relative to the lateral portions and meets therewith via merging edge regions, said lateral portions of the pocket rear wall converging from outer ends thereof in a direction towards a front end of the at least one pocket; and a cutting insert seated in said at least one insert receiving pocket, the cutting insert comprising:

a front cutting portion having an operative front surface associated with at lease one cutting edge;

a trailing mounting portion having upper, lower and first and second side walls extending from said front cutting portion to a rear abutment wall the first and second side walls meeting with said rear abutment wall at respective first and second rear edges, wherein the rear abutment wall comprises:

a central surface extending in a direction away from the front cutting portion to protrude rearwardly past a reference plane passing through said first and second rear edges; and a first and second lateral surfaces positioned between the first and second rear edges, respectively, and the central surface, each of the first and second lateral surfaces extending in a direction towards the front cutting portion and being positioned between the reference plane and the front cutting portion.

22. A cutting tool assembly according to claim 21, wherein the lateral surfaces of the cutting insert lie substantially on a first cylindrical arc having a radius (R) and the central surface of the cutting insert lies substantially on a second cylindrical arc having a radius (r).

23. A cutting tool assembly according to claim 22, wherein the radius (r) of the second cylindrical arc is substantially smaller than the radius (R) of the first cylindrical arc.

* * * * *